(12) United States Patent
Stepura et al.

(10) Patent No.: US 11,370,538 B2
(45) Date of Patent: Jun. 28, 2022

(54) FULLY AUTOMATED LAUNCH AND RECOVERY PLATFORM FOR UNMANNED AERIAL VEHICLE

(71) Applicant: Skyeton USA Inc., Lewes, DE (US)

(72) Inventors: Oleksandr Volodymyrovych Stepura, Kyivo-Svyatoshynskyy raion (UA); Mykola Mykolaiovytch Toptun, Brovarskyy raion (UA)

(73) Assignee: Skyeton USA Inc., Lewes, DE (US)

( * ) Notice: Subject to any disclaimer, the term of this patent is extended or adjusted under 35 U.S.C. 154(b) by 743 days.

(21) Appl. No.: 16/217,663

(22) Filed: Dec. 12, 2018

(65) Prior Publication Data

US 2020/0079505 A1 Mar. 12, 2020

(30) Foreign Application Priority Data

Sep. 10, 2018 (UA) .................... 2018 09217

(51) Int. Cl.
| | |
|---|---|
| *B64C 39/02* | (2006.01) |
| *G05D 1/02* | (2020.01) |
| *G08G 5/00* | (2006.01) |
| *G05D 1/06* | (2006.01) |

(52) U.S. Cl.
CPC ......... *B64C 39/024* (2013.01); *G05D 1/0204* (2013.01); *G05D 1/0661* (2013.01); *G05D 1/0676* (2013.01); *G08G 5/0069* (2013.01); *B64C 2201/084* (2013.01); *B64C 2201/182* (2013.01)

(58) Field of Classification Search
CPC ............ B64C 39/024; B64C 2201/084; B64C 2201/182; B64C 2201/021; B64C 2201/165; G05D 1/0204; G05D 1/0661; G05D 1/0676; G08G 5/0069; B64F 1/0297; B64F 1/029; B64F 1/04
See application file for complete search history.

(56) References Cited

U.S. PATENT DOCUMENTS

2018/0079530 A1\* 3/2018 Wyrobek ................ B64F 1/029

\* cited by examiner

*Primary Examiner* — Geepy Pe
*Assistant Examiner* — Daniel Tyler Reich
(74) *Attorney, Agent, or Firm* — Oblon, McClelland, Maier & Neustadt, L.L.P.

(57) ABSTRACT

A network of automated launch and recovery platforms (LRPs) for at least one aircraft-type aerial vehicle (UAV) which automatically perform cyclic tasks of preparation, launch, and recovery without manual operation. Each LRP includes a stationary foundation in an X-Z plane, a rotatable foundation that can rotate around a Y axis of the stationary foundation, and a rotatable leverage that rotates around the Z axis at a shaft driven by a motor. A first leverage of the UAV is hooked to the rotatable leverage of the LRP such that rotation of the shaft by the motor drives the rotatable leverage and the UAV for take-off and reduces UAV to stop during recovery. The network includes a traffic control subsystem and a launch and recovery subsystem which provides initial UAV speed necessary for launch, and ensures dissipation of kinetic energy of a captured UAV during recovery.

9 Claims, 11 Drawing Sheets

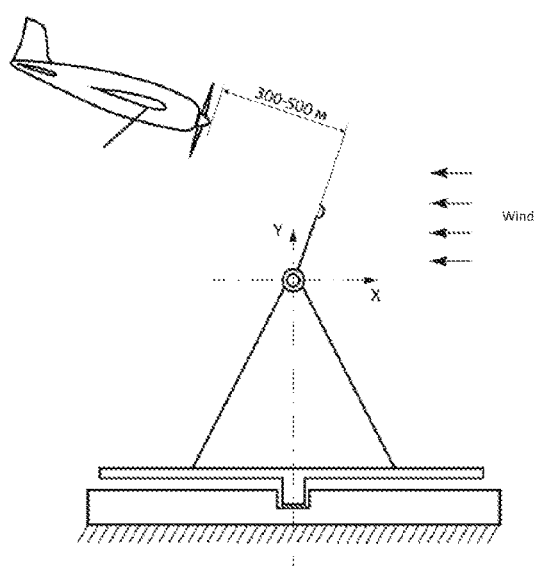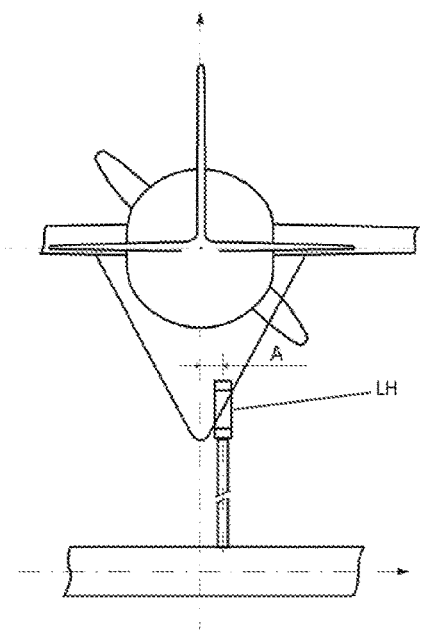
FIG. 10                    FIG. 11

FULLY AUTOMATED LAUNCH AND RECOVERY PLATFORM FOR UNMANNED AERIAL VEHICLE

CROSS-REFERENCE TO RELATED APPLICATION

This application is based upon and claims the benefit of priority from the prior Ukrainian Patent Application No. 2018 09217, filed on Sep. 10, 2018, the entire contents of which are incorporated herein by reference.

BACKGROUND

Field of the Invention

The present disclosure relates generally to an automated launch and recovery system for an unmanned aerial vehicle, and in particular for an aircraft-type aerial vehicle, with fixed wing.

Description of the Related Art

An aircraft-type aerial vehicle, with fixed wing, may fly when the air speed is greater than or equal to the speed at which the wing creates a lift equal to the weight of the aerial vehicle. However, landing such a winged aircraft is difficult. It is difficult to reduce the speed of an aerial vehicle to zero by a single small-scale device. Often overload occurs when the relatively large aerial vehicle is caught by a relatively small device. In other words, overload may be overload of the small device when it encounters the large load of the relatively large aerial vehicle such that it is difficult or impossible to bring the aerial vehicle to a complete stop. Such overload may cause either a decrease in useful life of the small device, or damage or destruction of the aerial vehicle.

Several approaches to landing the unmanned aerial vehicles (UAVs) by various small-scale devices have been attempted. One small-scale device is a net barrier, in which unmanned aerial vehicles fly and cling to the net. Another small-scale device is ropes, in which the UAV clings by means of different types of hooks while flying at the specified distance from a catching device. Both of these devices require removal of the aircraft by operators, and further manual operation in order to prepare the removal of the aircraft by operators, as well as further manual operation to prepare the vehicle for the next flight. Each time an aerial vehicle is to be launched, it must be manually installed on a launcher. In other words, although launch and landing is performed by respective systems, substantial manual operation is needed.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

Conventional and background systems relevant to the technological field of the present disclosure are shown in US 2017/0113815A1, U.S. Pat. No. 9,957,064B2, CN 104787351B, WO 2009/048666A2, and U.S. Pat. No. 7,097,137B2.

SUMMARY

According to an embodiment of the present disclosure, there is provided an automated launch and recovery platform (LRP) for at least one unmanned aircraft-type aerial vehicle (UAV) which automatically performs cyclic tasks of preparation, launch, and recovery, the UAV having a leverage, the LRP defining an X axis, Y axis and Z axis. The LRP includes a stationary foundation in the X-Z plane, such that the Y axis is perpendicular to the stationary foundation, a rotatable foundation that can rotate around the Y axis of the stationary foundation, and a rotatable leverage that rotates around the Z axis at a shaft driven by a motor.

The first leverage of the UAV is hooked to the rotatable leverage of the LRP such that rotation of the shaft by the motor places the rotatable leverage and the UAV into a service point, or ready-to-start point, and drives the rotatable leverage and the UAV for take-off. The LRP further includes a traffic control subsystem which provides interaction between the automated launch and recovery platform (LRP) and the UAV. Finally, the LRP includes a launch and recovery subsystem which provides initial UAV speed necessary for launch, and ensures the capture of the leverage by the LRP and dissipation of kinetic energy of a captured UAV during recovery.

According to an embodiment of the present disclosure, the unmovable foundation is supplemented with a gyrostabilization system to compensate for rolling of a ship. Furthermore, the LRP includes a weather station for detecting wind direction, where the rotatable foundation is configured to be rotated to ensure the UAV has take-off against the wind. During the recovery, the wind speed is estimated as the difference between the air speed of the UAV and the ground speed of the LRP, as well as via the weather station, and the UAV approaches the LRP on the leeward side. At a first predetermined distance between the UAV and the LRP, the LRP directs an emitter towards the UAV and the UAV automatically adjusts its trajectory. At a second predetermined distance between the UAV and the LRP the UAV engine switches off to prevent a collision by the propeller and to remove a drawing engine force of the UAV.

According to an embodiment of the present disclosure, the LRP also includes a diagnostics subsystem, wherein, after recovery of the UAV and prior to subsequent lift-off of the UAV, the diagnostics subsystem performs automatic diagnostics of the UAV and LRP status to determine if repairs or adjustments are needed. The shaft is supported by a pair of supporting racks of the rotatable foundation, and a distance between the supporting racks of the rotatable foundation exceeds the wing span of the UAV by double the vibration amplitude of the rotatable leverage.

According to an embodiment of the present disclosure, an end of the rotatable leverage away from the shaft includes a C-shaped locking hook for hooking to the first leverage of the UAV. The C-shaped locking hook includes a movable post that is movable into an opened position and a closed position. The C-shaped locking hook is placed in an opened position by a spring actuator.

According to an embodiment of the present disclosure, during the recovery, the rotatable leverage and the first leverage are arranged to allow displacement of the axis of one leverage from the axis of the other leverage at the moment of contact by not more than half of the horizontal width dimension of the first leverage.

According to an embodiment of the present disclosure, a network of automated launch and recovery platforms (LRPs) for at least one aircraft-type aerial vehicle (UAV) includes LRPS, each of which automatically perform cyclic tasks of preparation, launch, and recovery. Each LRP includes a stationary foundation in an X-Z plane such that a Y axis is perpendicular to the stationary foundation and a rotatable foundation that can rotate around the Y axis of the stationary foundation. Each LRP also includes a rotatable leverage that rotates around the Z axis at a shaft driven by a motor.

According to an embodiment of the present disclosure, the first leverage of the UAV is hooked to the rotatable leverage of the LRP such that rotation of the shaft by the motor places the rotatable leverage and the UAV into a service point, or ready-to-start point, and drives the rotatable leverage and the UAV for take-off. The network includes a traffic control subsystem which integrates the LRPs and provides interaction between the LRPs and between one of the LRPs and the UAV and a launch and recovery subsystem which provides initial UAV speed necessary for launch, and ensures the capture of the first leverage by the LRP and dissipation of kinetic energy of a captured UAV during recovery.

According to an embodiment of the present disclosure, the traffic control subsystem provides centralized control for the network of LRPs and coordinates the transfer of a UAV from one LRP to another LRP. During recovery, the UAV controlled by an autopilot requests permission from a nearest LRP, and if the nearest LRP is occupied, the LRP assesses whether the UAV can fly to another nearby LRP via the traffic control subsystem. At least one of the LRPs is located on a ship, where the unmovable foundation is supplemented with a gyrostabilization system to compensate for rolling of the ship.

According to an embodiment of the present disclosure, the network includes a weather station for detecting wind direction, where the rotatable foundation of each LRP is configured to be rotated to ensure the UAV has a take-off against the wind. During the recovery, the UAV approaches a nearest LRP on the leeward side and the wind speed is estimated as the difference between the air speed of the UAV and the ground speed of the LRP, as well as via the weather station. At a first predetermined distance between the UAV and the LRP, the LRP directs an emitter towards the UAV and the UAV automatically adjusts its trajectory. At a second predetermined distance between the UAV and the LRP, the UAV engine switches off to prevent a collision by the propeller of the UAV and to remove a drawing engine force of the UAV.

Each LRP includes a diagnostics subsystem, wherein after recovery of the UAV and prior to subsequent lift-off of the UAV, the diagnostics subsystem performs automatic diagnostics of the UAV and LRP status to determine if repairs or adjustments are needed. At least one of the LRPs that is not occupied by a UAV positions the rotatable leverage in a raised vertical position. During recovery, a locking hook at an end of the rotatable leverage catches an opening of the first leverage and is engaged to hold the UAV to the rotatable leverage.

According to an embodiment of the present disclosure, at least one of the LRPs that is not occupied by a UAV positions the rotatable leverage in a raised position at an angle offset from vertical. During recovery, the rotatable leverage is rotated when the end of the rotatable leverage catches an opening of the first leverage in order to reduce difference in speeds between the UAV and the rotatable leverage.

According to an embodiment of the present disclosure, a non-transitory computer-readable storage medium storing computer-executable code coordinates interactive communication between a plurality of automated launch and recovery platforms (LRPs) and between at least one LRP and at least one unmanned aircraft aerial vehicle (UAV) when executed by a computer. The computer-readable storage medium includes instructions for automatically performing a cycle including preparing the at least one UAV for launch, launching the at least one UAV, and recovering a UAV. The cycle is performed such that initial UAV speed necessary for launch and direction against the wind are provided during the launch. The cycle is performed such that an onboard leverage of the UAV is captured and locked by a rotatable leverage of the LRP and kinetic energy of the UAV is dissipated curing recovery.

According to an embodiment of the present disclosure, a control method for an automated launch and recovery platform (LRP) performs cyclic tasks of servicing, launch, and recovery of an unmanned aircraft-type aerial vehicle (UAV) having a first leverage, the LRP defining an X axis, Y axis and Z axis. The method includes controlling recovery of an approaching UAV by acquiring wind speed and direction at the LRP, communicating the wind speed and direction at the LRP to the approaching UAV, rotating a rotatable foundation of the LRP around the Y axis such that the LRP is positioned to recover the UAV approaching from a direction against with respect to the LRP, transmitting a signal toward the UAV for trajectory adjustment of the UAV, setting a rotatable leverage of the LRP into a recovery position, the rotatable leverage being configured to rotate around the Z axis at a shaft driven by a motor, and engaging the rotatable leverage with a leverage of the UAV such that rotation of the shaft by the motor places the rotatable leverage and the UAV into a service point. The method further includes controlling automatic servicing of a UAV held at the service point by the rotatable leverage, the servicing including at least one of refueling, recharging, unloading a payload, loading a new payload, de-icing, performing routine maintenance, downloading data, and uploading software updates. Finally, the method includes controlling take-off of a UAV from the service point in which the UAV is held by the rotatable leverage by acquiring wind speed and direction at the LRP, rotating the rotatable foundation of the LRP around the Y axis such that the LRP is positioned for a take-off against the wind of the UAV with respect to the LRP, rotating the rotatable leverage with positive acceleration such that the UAV is moving at a necessary take-off speed at an upper point in the movement trajectory of the rotatable leverage, and disengaging the rotatable leverage from the leverage of the UAV at the upper point.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 10 is a diagram illustrating the launch and recovery platform at the moment that the UAV approaches the landing and recovery platform in accordance with an exemplary aspect of the disclosure;

FIG. 11 is a diagram illustrating the launch and recovery platform while the UAV is engaging the Rotating Leverage panel in accordance with an exemplary aspect of the disclosure;

DETAILED DESCRIPTION

Figures 1, 2:
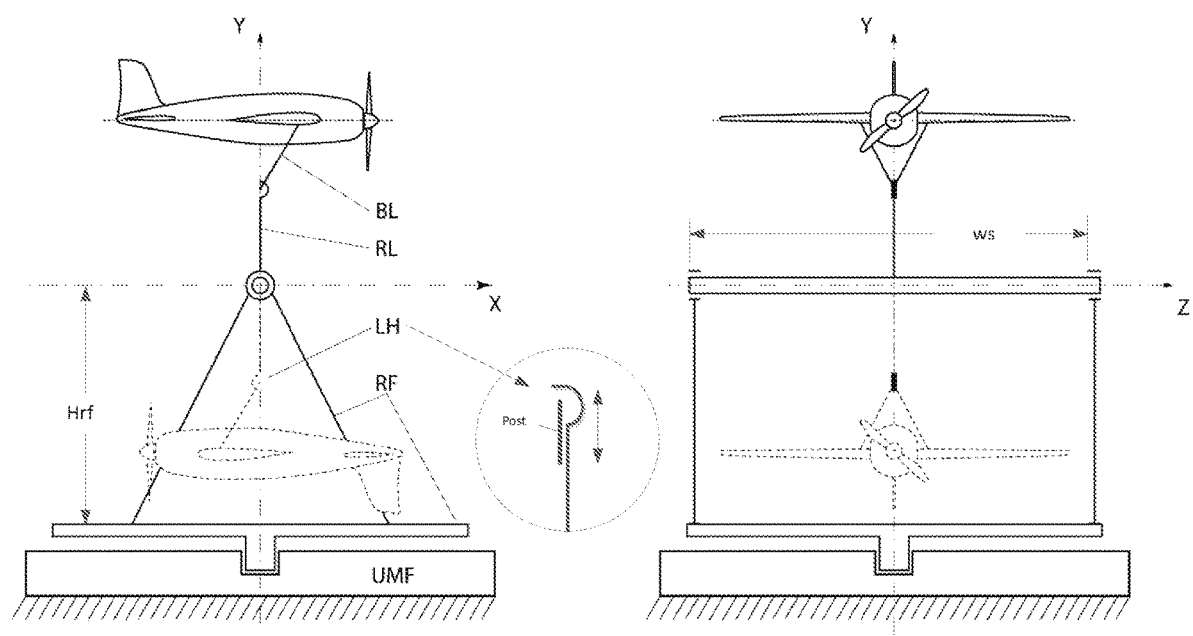
FIG. 1 is a diagram illustrating an automated launch and recovery platform in accordance with exemplary aspects of the disclosure.
FIG. 2 is a diagram illustrating an automated launch and recovery platform in accordance with exemplary aspects of the disclosure.

As used herein any reference to "one embodiment" or "some embodiments" or "an embodiment" means that a particular element, feature, structure, or characteristic described in connection with the embodiment is included in at least one embodiment. The appearances of the phrase "in one embodiment" in various places in the specification are not necessarily all referring to the same embodiment. Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. In addition, the articles "a" and "an" as used in this application and the appended claims are to be construed to mean "one or more" or "at least one" unless specified otherwise.

Referring now to the drawings, wherein like reference numerals designate identical or corresponding parts throughout several views, the following description relates to a system and method for automated launch and recovery of unmanned aerial vehicles. The method solves problems associated with automating the complete UAV operation cycle of launch, landing upon completion of the flight task completion, refueling (or charging), and subsequent launch.

Disclosed embodiments enable the UAV to interact with an automated launch and recovery platform (LRP) so that the UAV once installed in the disclosed system is automatically launched into flight and recovered to bring the landed UAV to the position ready for the next unassisted launch any number of times, regulated only by an operator's task, service activities for support and repair of the UAV or platform, and the service life of the system components.

FIG. 1 is a diagram illustrating an automated launch and recovery platform in accordance with exemplary aspects of the disclosure. The automated launch and recovery platform (LRP) includes an unmovable foundation (UmF), a rotating foundation (RF), and a rotating leverage (RL). The unmovable foundation UmF is fixed and is the foundation for the entire LRP. In this disclosure, the UmF is in a plane in the X-Z direction. The Y direction is perpendicular to the UmF. In a case that the platform is ship-based the platform can be supplemented with a gyrostabilization system in order to compensate for roll. The rotating foundation RF is mounted on the UmF platform and can rotate around the Y axis. The rotating foundation RF includes a pair of angled support racks joined at the top by a rotating shaft. The rotating leverage RL panel is attached at the top of the RF platform at the rotating axle and, as can be seen in FIG. 2, rotates around the shaft arranged in the Z axis. The end of the rotating leverage RL includes a locking hook (LH) that engages with a leverage panel (BL) of the UAV. The locking hook LH can be placed in a closed or an opened position. A possible arrangement of a locking hook LH is shown in the blown-up view of FIG. 1. In this arrangement, the locking hook LH may include a movable post (see arrow) that may be used to close off the C-shaped hook portion. In some embodiments, the movable host is spring activated toward the closed position such that force is required to move the post into an opened position.

The UmF is stationary and permanently fixed to an area where the whole LRP is located: a ground, a flat roof of a building, and the like. It is preferred that the UmF be installed horizontally. As mentioned above, in a ship-based case, the platform can be supplemented with a gyrostabilization system.

The RF can rotate in relation to the UmF around the Y axis. The RF is rotated by a motor having a control that makes it possible to drive and stop rotation at the required moment with a required accuracy. Control of RF platform rotation enables orientating it in relation to the wind direction so that the direction of the UAV flight approaching or launching the LRP is always against the wind.

Another motor is located on an end of the rotating shaft to rotate the RL. The motor can precisely control its driving and stopping, as well as the conversion of the kinetic energy of the flying UAV into another kind of energy which can be accumulated and used for take-off (for example, potential energy in the form of electric potential energy, compressed air energy, hydraulic energy, mechanical potential energy). The motor rotates the shaft and, accordingly, rotates the RL panel fixed therein. This makes it possible to put the RL panel into the uppermost position, i.e., the position of the lock engagement and the mating part on board of a UAV, and also to move the engaged UAV to a service point, and a ready-to-start point.

It is preferred that the length and width of the LRP in the X and Z directions do not exceed 1.5 times the length of the wing span of the UAV to be provided for launch and landing.

It is preferred that the distance ws between the angled support racks (see FIG. 2) of the RF platform should exceed the wing span of the UAV by doubled vibration amplitude of the RL panel. The vibration may be caused by the non-perfect coordination of the locks on the RL panel and the mating part on the board of the UAV during connection. The preferred ws distance is to ensure that the vibration is not excessive such that it may impair control of the UAV during launch and landing.

The distance between support racks of the RF platform exceeds the wing span of the UAV, in order to accommodate the UAV therebetween. In some embodiments, the additional distance between the support racks beyond the wing span of the UAV is based at least partially on predicted swing of the UAV in the Z-axis upon landing and launch, which is in turn based at least partially on the rigidity of the BL and RL consoles. In one exemplary embodiment, if the RI: console, as a result of its known constructive flexibility, is predicted to deviate from its normal position in the Z-axis by about 100 mm and the wing span of the UAV is 3 m, then the distance between the support racks of the RF platform may be at least 3.2 m, thereby adding an additional 0.1 m of buffer space to the wing span of the UAV and the predicted deviation of the RL console. Of course, should other components, such as the BL console, introduce additional predicted deviation in the Z-axis direction upon landing or launch, such additional predicted deviation would be added to the minimum distance required between the support racks of the RF platform to avoid contact between the support racks and any part of the UAV.

It is preferred that the height Hrf of the RF is greater than the total length of the RL panel and the maximum dimensions of the UAV in the longitudinal section along its central axis. The height Hrf preferably takes into account the dimensions of the docking device released from the UAV, as well as the possible deviations of the UAV in terms of possible degrees of freedom. Thus, the height Hrf preferably assumes passage of the UAV in the lowermost point of the UAV hanging on the RL panel with the necessary clearance.

The length of the RL panel is preferably calculated so that the path to be passed by the UAV along the circumference, already docked to the RL panel, from the uppermost point to the lowermost point, enables the UAV's speed to decrease to zero within allowable overload.

The formula for deceleration (overload) to stop moving of the UAV body to zero, with the known initial velocity V at which the UAV engages the RF platform and the passed path S from the point of engagement of the UAV with the RF platform to stop is as follows:

$$a = \frac{V^2}{(2S * 9.8)}$$

For example, the UAV engages the RF platform at 70 km/h (19.4 m/s), and the length of RL from the point of engagement with the BL panel to the point at which the RL contacts the horizontal rotating axle of the RF platform is 2 m. Therefore, the passed path S from the point of engagement of the UAV at a position when the RL panel is vertical and pointing upward to a position when the RL panel is vertical and pointing downward is half of the circumference of a circle having the length of RL as the radius, namely 2 m*π=6.3 m. In some embodiments, the passed path S is not half of the circumference, but is another known fraction of the circumference, for example in embodiments where the RL panel is not vertical at the time of engagement with the UAV, but is instead angled. However, assuming that V is 19.4 m/s and S is 6.3 m, then overload based on the above equation is then 3.0 m/s$^2$. In some embodiments, system parameters and materials are selected to ensure an overload that is less than 5 m/s$^2$. In some embodiments, the upper bound for overload is selected by taking into consideration the endurance characteristics of system materials, such as light composite materials like plastic and aluminum, as well as the desired longevity of the system in numbers of launches and landings.

It is preferred that the RL panel be light enough and flexible so that the impact force in a case of collision of the inertial mass of the flying UAV and the mass fixed in the upper position of the RL panel itself does not result in instantaneous or cyclical destruction of the LRP structure.

In a case of large kinetic energy of the UAV, the problem of collision may be solved by controlling the time-reference actuation of the RL panel to decrease the difference in the velocities of the UAV and rotatable RL panel, which brings the impact loads to an acceptable value.

In some embodiments the LRP includes a weather station for measuring wind speed and wind direction, which are used to determine the best approach direction and speed of a UAV about to land on the LRP. In other embodiments, the weather conditions including wind speed and wind direction are communicated to one or both of the LRP and the UAV from another source, for example a near-by weather station or a weather information server. Either the UAV or the LRP determines the approach direction and speed based on the weather conditions and communicates the approach direction and speed to the other one of the UAV and LRP. The LRP may then rotate to face the approach direction, which in some embodiments is such that the approaching UAV approaches against the wind. The LRP self-diagnostic system is configured to detect any unacceptable distortions or fractures on LRP components, such as the RL, that need to be addressed prior to further operation.

In this way, through communication with the approaching UAV, the LRP predicts the expected time, speed, and position of the UAV at the point where contact with the RL will be made. Based on these determined values, the LRP then calculates the necessary velocity of the RL when contact with the UAV is made and actuates rotation of the RL ahead of contact such that the RL is in the appropriate position at the appropriate time to make contact with the UAV and is moving at the calculated necessary velocity.

Figure 3:
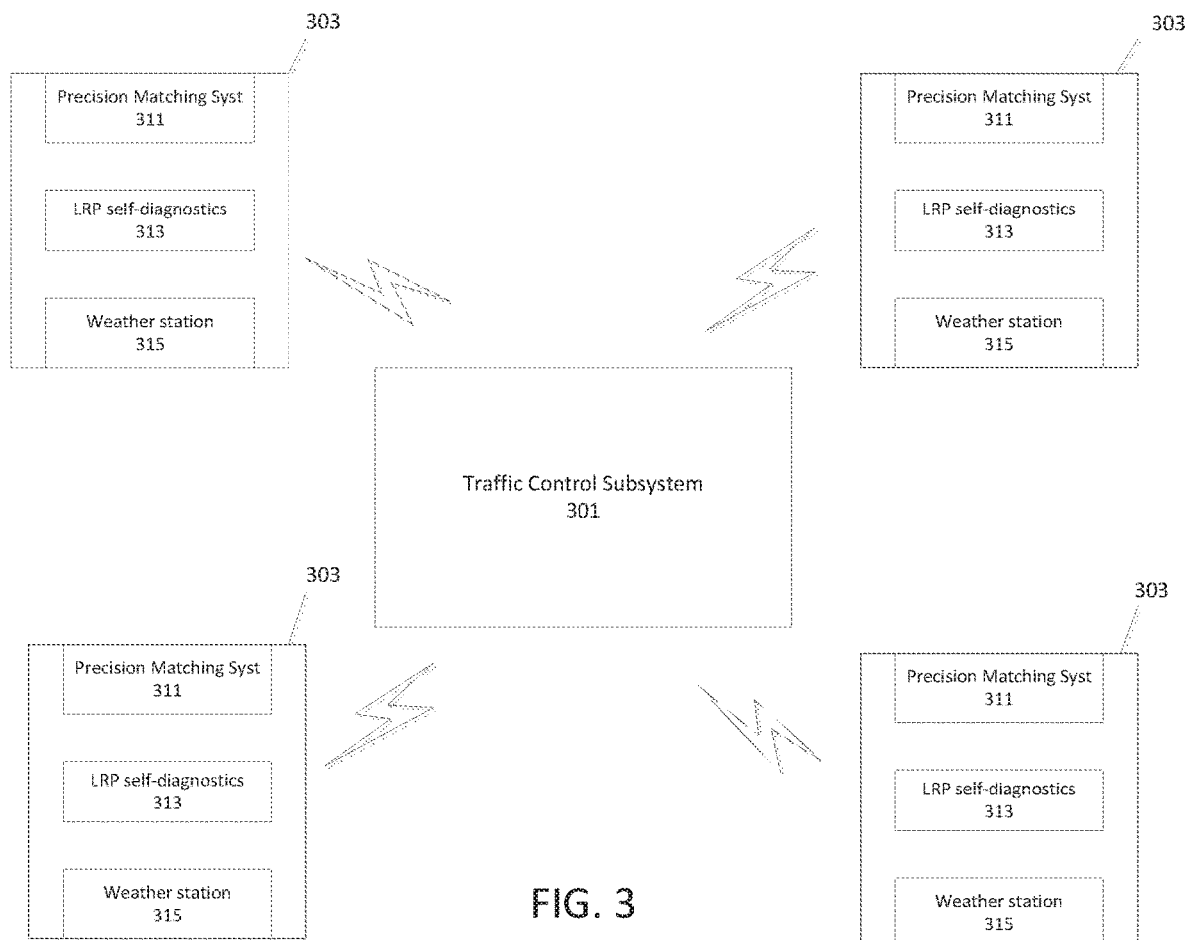
FIG. 3 is a block diagram of a launch and recovery system in accordance with an exemplary aspect of the disclosure.

FIG. 3 is a block diagram of a launch and recovery system in accordance with an exemplary aspect of the disclosure. The system may be provided with subsystems including a Precision Matching Subsystem (PMS), the traffic control subsystem, launch and recovery platforms (LRP), LRP self-diagnostics subsystem, and a weather station. For example, the LRP self-diagnostics subsystem may include a network of gauges and sensors to detect distortions or fractures of various components of the LRP, such as the RL. Disclosed embodiments include a number of launch and recovery platforms LRPs so that an equal number of UAV's may be deployed in an autonomous mode. It is expected that some UAV's may require service as indicated by automatic diagnostics. UAV's may undergo replacement of payload while docked at respective launch and recovery platforms. In some embodiments, the traffic control subsystem may be centralized for all launch and recovery platforms. In some embodiments, at least some subsystems are distributed in each launch and recovery platform, or at least distributed throughout the area where the launch and recovery platforms are situated.

Regarding FIG. 3, a centralized traffic control subsystem 301 integrates communication between two or more launch and recovery platforms LRPs 303 into a network and also facilitates coordination between an individual launch and recovery platform and a UAV. FIG. 3 shows a Precision Matching Subsystem (PMS) 311, LRP self-diagnostics subsystem 313 and a weather station 315 distributed in each LRP 303. However, these subsystems may be centrally located with the traffic control subsystem 301. In some embodiments a single weather station is located in the area where a group of LRPs are situated, while the PMS 311 and LRP self-diagnostics subsystem 313 are contained within each LRP, or proximate to each LRP.

The Precision Matching Subsystem PRM 311 automatically adjusts the UAV's trajectory with regard to LRP at the moment of landing with a specified accuracy. Launch and recovery platforms LRPs 303 physically ensure the capture of Board Leverage (BL) elements mounted on board of each UAV by LRP elements, dissipation (or transformation) of the kinetic energy of a flying UAV, and provision of initial UAV speed necessary for its launch. The LRP self-diagnostics system 313 makes it possible to assess the status of systems and nodes. The weather station 315 assesses the meteorological conditions in order to determine the parameters and possibility of UAV launch and recovery.

Details of the subsystems and their key features are described next. The Precision Matching System PMS 311 provides guidance of a UAV with the accuracy necessary for reliable operation of the overall system. The PMS 311 may perform guidance to adjust a UAV's trajectory relative to the LRP during landing under various physical principles. In one embodiment, the PMS may use a light source (or a surface reflecting light) for guidance. In one embodiment, the PMS may use a radio source (or surface reflecting radio waves) for guidance. In one embodiment, the PMS may use an acoustic radiation source for guidance. In each case, it is assumed that at leak the radiation source (or reflecting surface) is mounted to the LRP, and the receiver defining the deviation of the UAV trajectory from the direction to this source is placed on a UAV. In some embodiments, a visual guidance system is used when a video camera and a recognition system visually defining the deviation of the UAV trajectory are installed on board the UAV.

The LRP self-diagnostics subsystem 313 makes it possible to assess the status of subsystems and nodes in automatic mode, prevent accidents or damage in case of failure or deterioration of subsystem components, and also to send a signal about the need for maintenance (repair) of the subsystem or its components. For example, as described above, the LRP self-diagnostic subsystem 313 may include a network of gauges and sensors that detect deformations and/or fractures in various LRP components, such as the RL.

The traffic control subsystem 301 is a subsystem that may ensure the operation of any number of UAVs and LRPs, and includes a controller, with the possibility of coordinating several LRPs into a network secured by an external communication channel, a radio exchange channel between LRP and UAV for obtaining a landing permit, coordination of the azimuth of UAV's as they approach landing and activation of the guidance station equipment. Combining LRPs into a network makes it possible to coordinate the transfer of a UAV from one LRP to another one, to determine alternate LRP in emergency situations, and to optimize the distribution of UAVs between LRPs.

The weather station 315 evaluates the meteorological conditions in order to determine the parameters and the possibility of UAV takeoff and (or) landing. The weather station 315 may monitor and report meteorological conditions including wind speed, wind direction, and temperature, weather conditions such as rain, sleet, hail, snow, and whether the condition is a type of storm, such as tropical storm, hurricane, and other known storms.

Figure 4:
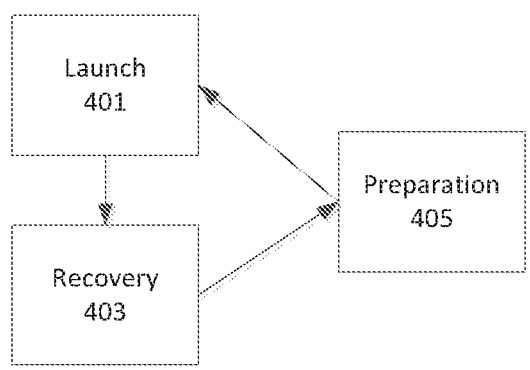
FIG. 4 is a flowchart for a launch and recovery system in accordance with an exemplary aspect of the disclosure.

FIG. 4 is a flowchart for a launch and recovery system in accordance with an exemplary aspect of the disclosure. Regarding FIG. 4, a full cycle of a UAV which includes launch 401, recovery 403 and preparation 405 for the next launch on the LRP platform is performed in a completely autonomous triode. During launch 401 the UAV is accelerated to take-off speed and launched into flight without manual operation. Then, the LRP switches into a mode ready to receive a UAV, establish communication with it and coordinate landing on the LRP. During recovery 403 the LRP coordinates landing and brings the landed UAV to the position ready for the next unassisted launch. During preparation 405 the LRP automatically refuels (charges), changes out any cargo load and performs diagnostics on the UAV. Such a cycle can be performed in a completely automatic mode any number of times, regulated only by an operator's task, service activities for support and repair of the UAV or platform, and the service life of the system components. Each of these processes are described in more detail below.

Figure 5:
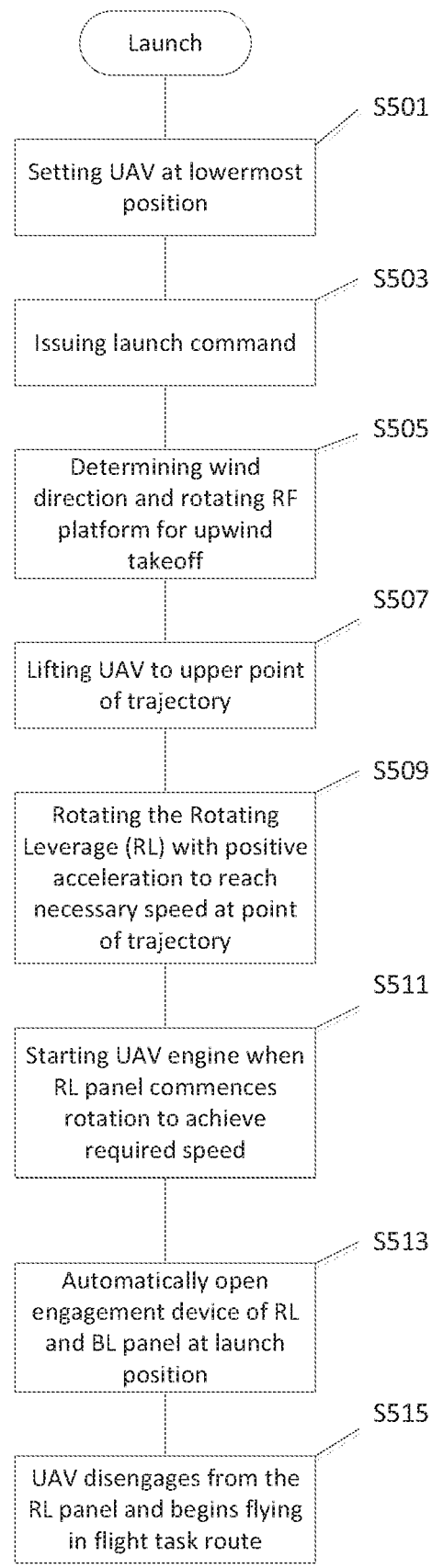
FIG. 5 is a flowchart for the launch process of FIG. 4 in accordance with an exemplary aspect of the disclosure.

FIG. 5 is a flowchart for the launch process of FIG. 4 in accordance with an exemplary aspect of the disclosure. In S501, the UAV must be once set by the operator on the LRP to the position shown in FIG. 6. In this position, the UAV is in the lowermost position and its board leverage BL is hooked on RL panel of the LRP platform.

When the UAV is ready to launch, in S503 a command is issued for launch at the moment determined by the traffic control subsystem 301.

In S505, a weather station 315 located on the LRP platform determines the direction of the wind upon receipt of the command for launch. It is preferred that the LRP platform control rotation of the RF platform so as to ensure UAV takeoff against the wind.

By means of a motor at the end of the RF shaft, in S507 the RL panel may lift the UAV to the upper point of the trajectory in order to additionally use the potential energy of the lifted body for UAV acceleration.

In S509, the motor on the RF shaft of the Z axis rotates the RL in the same direction as when landing and with the corresponding positive acceleration, so that at the desired point of the trajectory (determined by the required launch angle, which depends on the aerial vehicle's parameters), the UAV has the speed necessary to continue a stable flight, and the RL locking hook LH moves to an open position to allow the BL panel to release.

In S511, the UAV engine is started when the RL panel commences rotation, which rotates the UAV to achieve the required speed. Where appropriate, if the required speed for the UAV is not achieved at a given length of the accelerating trajectory, the motor on the RF shaft may be controlled to perform additional rotations in order to achieve the required speed.

In some embodiments, the rotation speed and acceleration of the RL panel is controlled such that, at the point of disengagement between the RL and the UAV on take-off, the speed of the UAV is at least 10-15 km/h higher than the tailspin speed of the UAV. For example, if the tailspin speed of a particular UAV is 60 km/h, the speed of the UAV at the point of disengagement from the RL panel may be at least 70-75 km/h.

Figure 7:
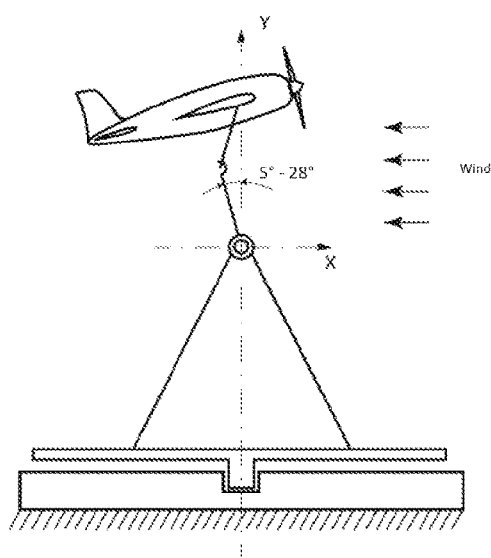
FIG. 7 is a diagram illustrating the launch and recovery platform in a position as the UAV disengages.

In S513, in launch position L, the locking hook LH of the RL panel on the launch and recovery platform is automatically opened and the engagement device of the BL panel on board the UAV can slide out of the opened locking hook. The locking hook LH may be a C-shaped clamp with a movable post that may be used to close the hook. In some embodiments the movable post may be spring loaded such that moving the post an open position requires force, for example by an actuator. As will be described later, the engagement device of the BL panel of the UAV may be triangular. In S515 the UAV disengages from the RL panel and flies in the flight task route. FIG. 7 is a diagram illustrating the launch and recovery platform in launch position during S515 as the UAV disengages. Regarding FIG. 7, the RL rotates clockwise to reach launch position while the BL panel on UAV is opened. In the exemplary embodiment of FIG. 7, the launch position is 5°-28° from the Y axis, however other launch positions will correspond to various embodiments, based on the engagement/disengagement mechanics of the RL and BL panels. In some embodiments, the launch position angle is determined in order to avoid tailspin of the UAV while maintaining the advantages of ballistic trajectory.

Figure 8:
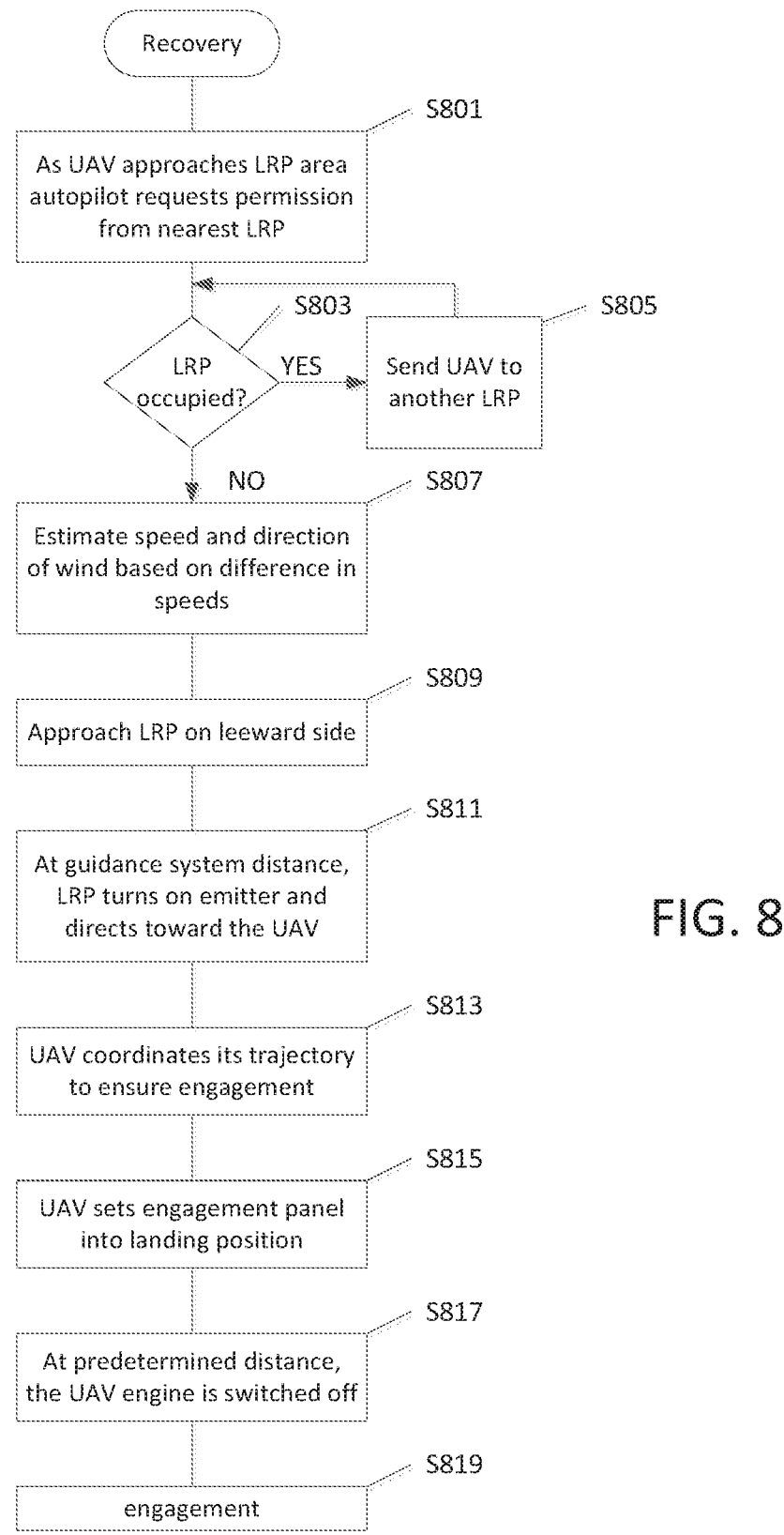
FIG. 8 is a flowchart for the recovery process of FIG. 4 in accordance with an exemplary aspect of the disclosure.

FIG. 8 is a flowchart for the recovery process of FIG. 4 in accordance with an exemplary aspect of the disclosure. In some embodiments, there may be a large number, for example several tens or a hundred or more, of LRPs and UAVs in an LRP location area. In some embodiments, there may be a single LRP that serves two or more UAVs. In one embodiment, a single LRP serves a single UAV. In the embodiments in which there is a single LRP, functions of the traffic control subsystem may be performed in the LRP without the need for a separate traffic control subsystem. In S801, the UAV, controlled by its autopilot, requests permission from the nearest LRP via the communication channel and approaches the LRP location area.

In some embodiments, the UAV determines the distance to a nearest LRP by receiving beacon signals or other communication signals from the LRP, which may indicate the distance to the LRP via signal strength or may indicate the coordinates of the LRP in the signal itself. In some embodiments, the UAV is programmed to return to the LRP from which it took off or to another pre-programmed LRP whose coordinates are stored in the memory of the UAV.

If the nearest LRP is occupied (YES in S803), the traffic control subsystem assesses the opportunity of UAV's flying to the nearest LRP by determining that the nearest LRP can be made temporarily available or, in S805 sends the UAV to another LRP. The traffic control subsystem makes reference to stored locations of each LRP, monitors the status of each LRP, and periodically receives coordinates of the UAV in order to inform the UAV of the assessment for landing. In embodiments in which there is a single LRP, the LRP may send communication to the UAV instructing that it remain in a holding pattern. Such communication may be sent at predetermined intervals until the LRP becomes available.

In S807, the speed and direction of the wind is estimated. FIG. 10 is a diagram illustrating the launch and recovery platform during S807 as the UAV approaches the landing and recovery platform. The wind speed is estimated as the difference between the air speed of the UAV and the ground speed of the LRP as well as via the weather station on the LRP. The air speed of the UAV may be obtained from the UAV. The wind direction is measured via the weather station on the LRP. Each measurement is made at the moment that the UAV's approach is on the leeward side. Regarding FIG. 10, the UAV is directed to approach the LRP against the wind, and the air and ground speed of the UAV may be measured when the UAV is at a distance of about 300 to 500 m from the LRP as it approaches.

In S811, also at a distance of guidance action of about 300 to 500 m, the LRP turns on an emitter directed towards the UAV. In some embodiments, the emitter emits a light or radio signal and may be located on the wings of the UAV. When receiving a signal from the LRP, in S813 the UAV adjusts its trajectory in order to ensure optimal engagement conditions. In some embodiments, the adjustment of step S813 includes adjusting the direction of flight such that an incoming signal from the LRP is received by receivers located on the wings of the UAV simultaneously. As a result of such adjustment, the glide path of the UAV aligns along the X-axis with the LRP. In some embodiments, the calibration of the navigation system of the UAV and the granularity of the adjustment of step S813 allows for a deviation of 20-30 mm or less in the alignment of the UAV with the LRP in the X axis direction. In some embodiments, the flight path to the LRP area is determined using a satellite navigation system. The satellite navigation system may also be used in the adjustment of the flight direction in step S813. In some embodiments, either additionally or alternatively to satellite navigation, sound, electromagnetic (radio) or light (visible or not) communication may be used by the UAV for accurate guidance. The carrier frequency, for example in radio communication, may be modulated to increase the noise immunity of the communication system.

In some embodiments, for the flight path adjustment in step S813, an emitter having a selected range is installed at or near the LRP. In other embodiments, a reflector is installed at or near the LRP, while the source is placed in another place, such that the signal emitted from the emitter is reflected by the reflector. The UAV locates the emitted signal and the source or reflector thereof, and thereby determines in two planes (axes), with a required accuracy, the angular deviation of the UAV's current trajectory from the direction toward the emitter/reflector. According to the determined angular deviation, and based on the principle of proportional-integral-differentiating (PID) regulation, control signals for control surfaces (elevator, ailerons, rudder) are formed, providing the necessary correction for the flight path.

In an exemplary embodiment, the emitted signal for flight path adjustment is in the near infrared range. The source of the emitted signal is a light-emitting diode laser of small power, emitting a signal having a wavelength of 960 nm and modulated by a sinusoid with a frequency of 2 kHz. In this exemplary embodiment, a reflector is installed at the point of guidance, for example somewhere at or near the LRP, and the laser emits a signal to be reflected by the reflector.

In an exemplary embodiment, the UAV is equipped with a direction finder, which may include a lens that provides focusing of the signal reflected by the reflector on a photodiode and a four-element photodiode providing data to determine the angles of deviation of its optical axis (which indicates the current axis of the aircraft) from the direction to the emitter/reflector of the signal. For example, the four-element photodiode may be an off-the-shelf photodiode assembly, such as multi-element silicon PIN photodiodes manufactured by Hamamatsu Photonics, model nos. S5980, S5981, or S5870.

The angles of deviation are determined in the direction finder based on the difference in the illumination of the photodiode elements. That is, if the UAV's current axis coincides with the direction to the emitter/reflector of the signal, all elements will be evenly illuminated. However, should the angle(s) of deviation be non-zero, the illumination of the photodiode elements will not be even and the unevenness of the illumination indicate the angles of deviation.

The direction finder of the UAV may also be equipped with a photodiode signal processing system and/or a microcontroller to process the raw data output from the photodiode, determine the angles of deviation between the UAV's current trajectory and the direction toward the emitter/reflector of the received signal, and outputting control signals to the autopilot of the UAV to adjust the trajectory in step S813.

After capturing the emitter source, in S815 the UAV sets (releases) the engagement panel BL into the landing position.

In S817, at a safe distance (to be determined by the system parameters), the UAV engine switches off in order to prevent a collision between the propeller and the lock or the bar of the panel and to remove a drawing engine force of the UAV, as the kinetic energy of the UAV can cause a possible destruction or a deformation of the UAV after engagement. In S819, the UAV undergoes an engagement process with the LRP. The engagement process involves an actuated locking mechanism having an open state and a closed state. On recovery, the mechanism is in an open state as UAV approaches and closes upon engagement. We should probably also have similar description (maybe not necessarily here) with respect to behavior of locking mechanism upon take-off. Also, mention that the composition of the locking mechanism, of RL, and of BL, are such that they can withstand the impact associated with engagement.

Figure 6:
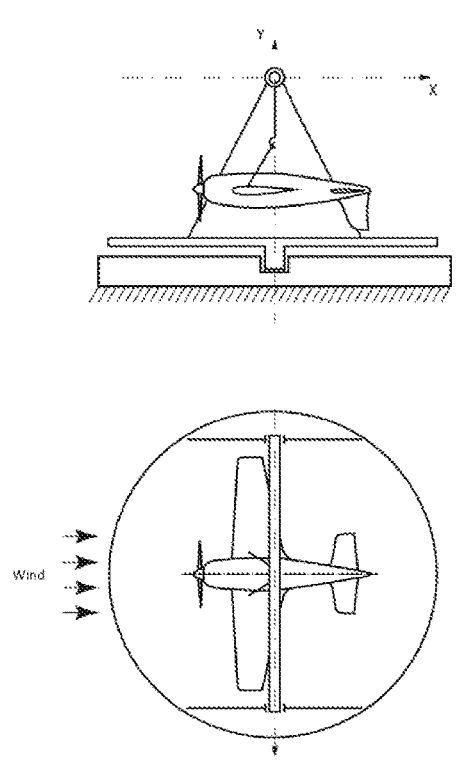
FIG. 6 is a diagram illustrating the launch and recovery platform with the UAV in the lowermost position.
Figure 9:
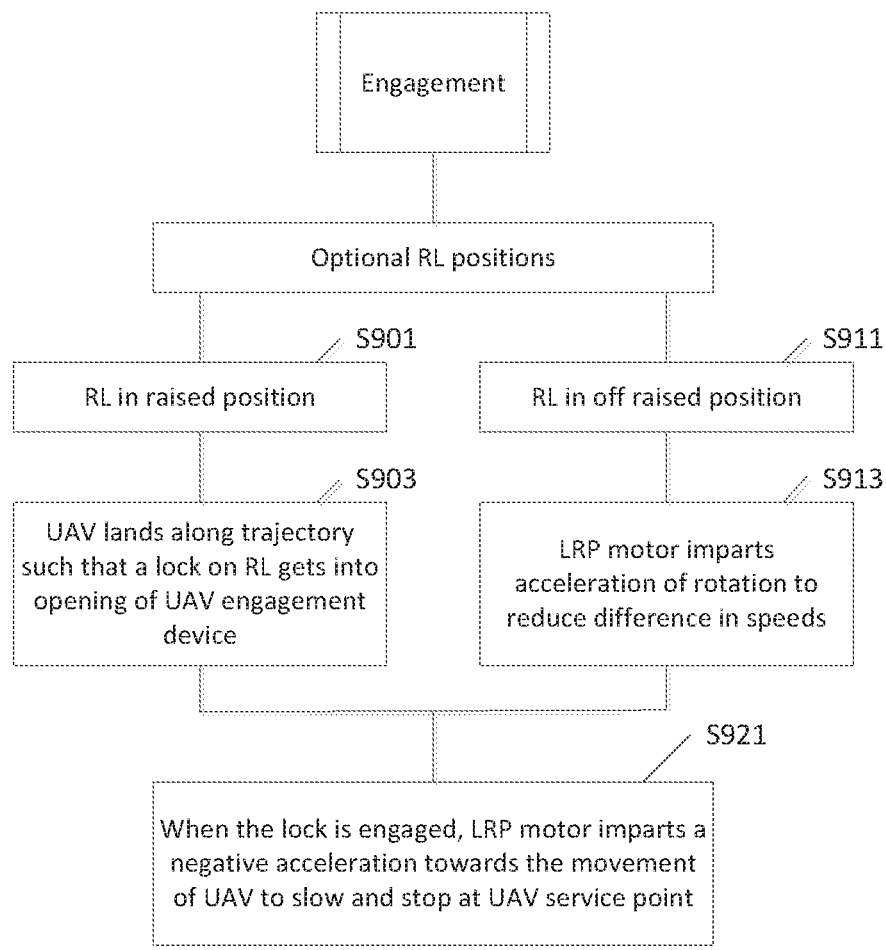
FIG. 9 is a flowchart for the engagement process of FIG. 8 in accordance with an exemplary aspect of the disclosure.

FIG. 9 is a flowchart for the engagement process of FIG. 8 in accordance with an exemplary aspect of the disclosure. In some embodiments, the engagement process may begin with one of two optional RL positions. It is preferred that the PMS provide the UAV's position where the lowest point of the BL panel touches the RL panel, intentionally below the locking hook (LH) mooring fitting (see FIG. 11), but not below the lower mounting point of the RL relative to the rotating Z axis. FIG. 11 is a diagram illustrating the launch and recovery platform while the UAV is engaging the Rotating Leverage panel in accordance with an exemplary aspect of the disclosure. As shown in FIG. 11, the BL panel may be triangular shape having a rounded vertex. In some embodiments, the BL panel may be arc shaped with a v-shaped notch at its mid-section. Then, under the action of the UAV the lower point of the BL panel creeps up to the locking hook LH until it fully enters it and the locking hook LH closes. In some embodiments, the locking hook includes a post (see FIG. 1) that may be quickly moved to a closed position by spring force. At the same moment, the RL panel holds the UAV in engagement and rotates radially towards the bottom of the RF platform until it fully stops at the lowest point on the Y axis (as shown in FIG. 6).

Figure 12:
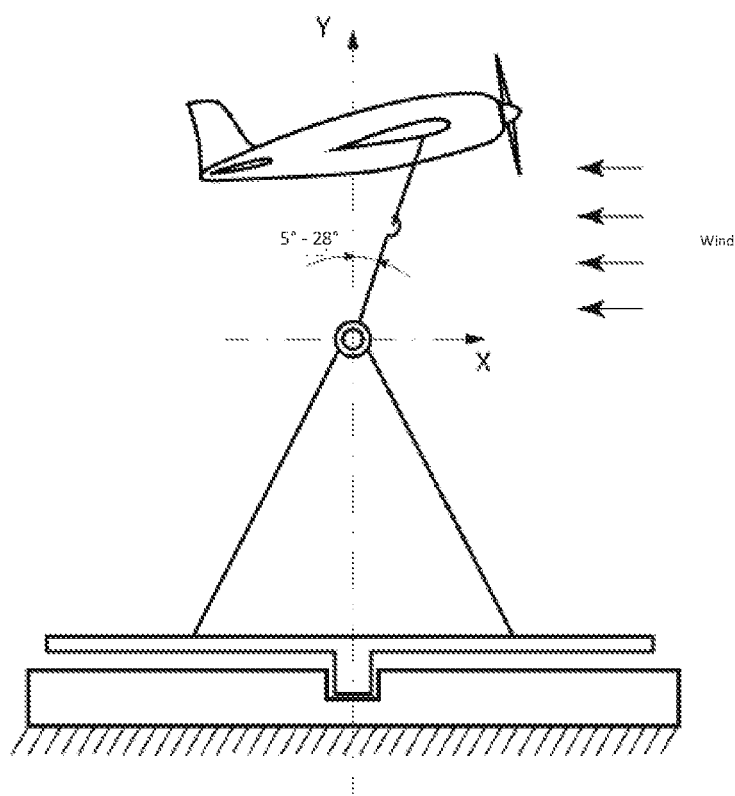
FIG. 12 is a diagram illustrating the launch and recovery platform with the UAV in an engagement position in accordance with an exemplary aspect of the disclosure.

Referring to FIG. 9, two variants of the initial RI, position are possible during the engagement process: the first one S901, when the RL panel is lifted in advance to the uppermost position, or is inclined at a predetermined angle towards the approaching UAV (as in the embodiment of FIG. 10) and is stationary in expectation of connection with the UAV. FIG. 12 is a diagram illustrating the launch and recovery platform with the UAV in an engagement position in accordance with an exemplary aspect of the disclosure. In this case, in S903 the UAV must come in for a landing along the trajectory so that the lock on the RL panel gets into the opening of the on board UAV engagement device before the UAV and LRP locks engage.

The second variant S911 of the engagement process is, when the UAV approaches, the RL panel is in a position other than vertical position and in S913 the motor on the shaft of Z axis imparts acceleration of rotation necessary to reduce the difference in the speeds of the RL lock and of the flying UAV, to reduce the force of impact therebetween. It is preferred that the rotating leverage RL, locking hook LH and board leverage BL be made of material and be of a size sufficient to handle the force of the UAV as it engages the LRP during recovery.

The selection of engagement process is determined by the condition of impact loads, to ensure the necessary system capability determined by the kinetic energy of the flying UAV, as well as the mass of the colliding parts and their resistance to impact loads.

Given these factors, the engagement process may be selected between having a fixed RL awaiting engagement with a landing UAV or a rotating RL. For simplicity of design and operation, the engagement process of having a fixed RL may be selected in embodiments in which the overloads occurring at engagement between the RL and BL can be borne by the system during its operational lifetime. On the other hand, if durability of the system is to be maximized, in some embodiments the rotating RL engagement process may be selected to reduce the impact of the inertial mass of the UAV on the system upon engagement. In some embodiments, the impact of the inertial mass of the UAV on the system may be reduced by reducing the difference in the speeds of the RL and BL panels.

It is preferred that the engagement device on the RL panel and on the on-board BL panel allows the displacement of the axis of one panel from the axis of the other one at the moment of contact by not more than half of the horizontal width dimension of the BL panel at a predetermined vertical point thereof (size A in FIG. 11).

When the locks of the docking device on board of an UAV and RL panel engage, in S921 the motor on the shaft of the Z axis imparts on the RL panel a rotational negative acceleration towards the movement of the UAV in order to stop the engaged UAV at the UAV service point.

The negative acceleration required to bring the UAV to a complete stop is calculated by $$a = \frac{V^2}{(2S * 9.8)}$$

For example, if the UAV is landing at a speed of 90 km/h (25 m/s) at the point of engagement with the RL and the combined length of the RL and BL panels is 3 m, we may approximate S as half the circumference of a circle with a radius of 3 m (i.e., $\pi r = 3\pi \approx 9.42$ m). We then apply this value of S, as well as the speed of 25 m/s, into the equation above to calculate a required negative acceleration a of $-3.4$ m/s$^2$.

If the trajectory length is not sufficient to stop the UAV within allowable overload at the lowest point, it is possible to continue the movement along the arc trajectory up to several revolutions. When the speed is at or below a predetermined value, the motor moves the UAV to the service point, i.e., usually the lowest point of the arc trajectory, (see FIG. 6)

Figure 13:
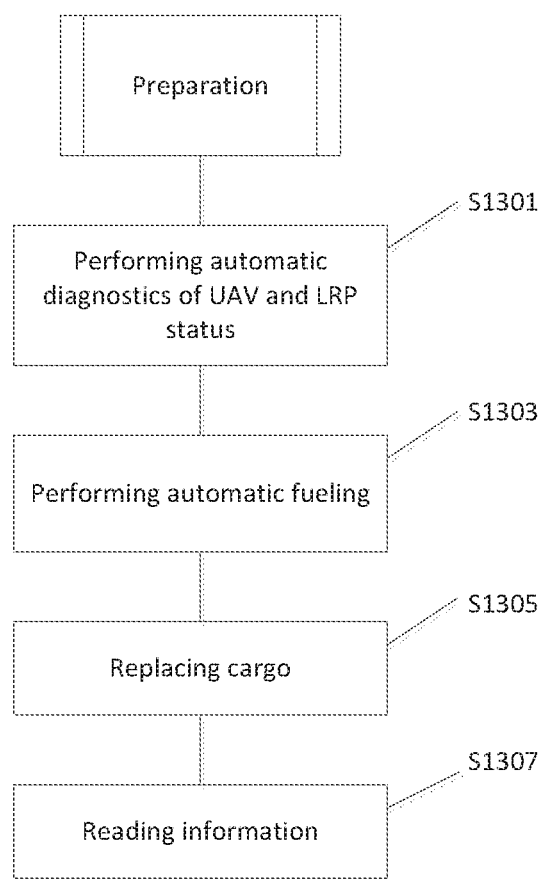
FIG. 13 is a flowchart for the preparation process of FIG. 4 in accordance with an exemplary aspect of the disclosure.

FIG. 13 is a flowchart for the preparation process of FIG. 4 in accordance with an exemplary aspect of the disclosure. When the landing 403 is completed, in S1301 the automatic diagnostics of the UAV and LRP status is performed. In S1303 automatic refueling, in case of using the liquid fuel, or charging, in case of an electric drive is performed. In S1305 the replacement of useful load (if necessary) is performed. In S1307 reading of information from data carriers is performed, if required, as well as other necessary actions. For example, once in a service position, the UAV transmits to the LRP its fuel level and any payload to be removed. In response, the LRP connects its fuel hose to the gas tank of the UAV and actuates a platform or other mechanism to remove the payload from the UAV or replenish the payload for the next mission.

Figure 14:
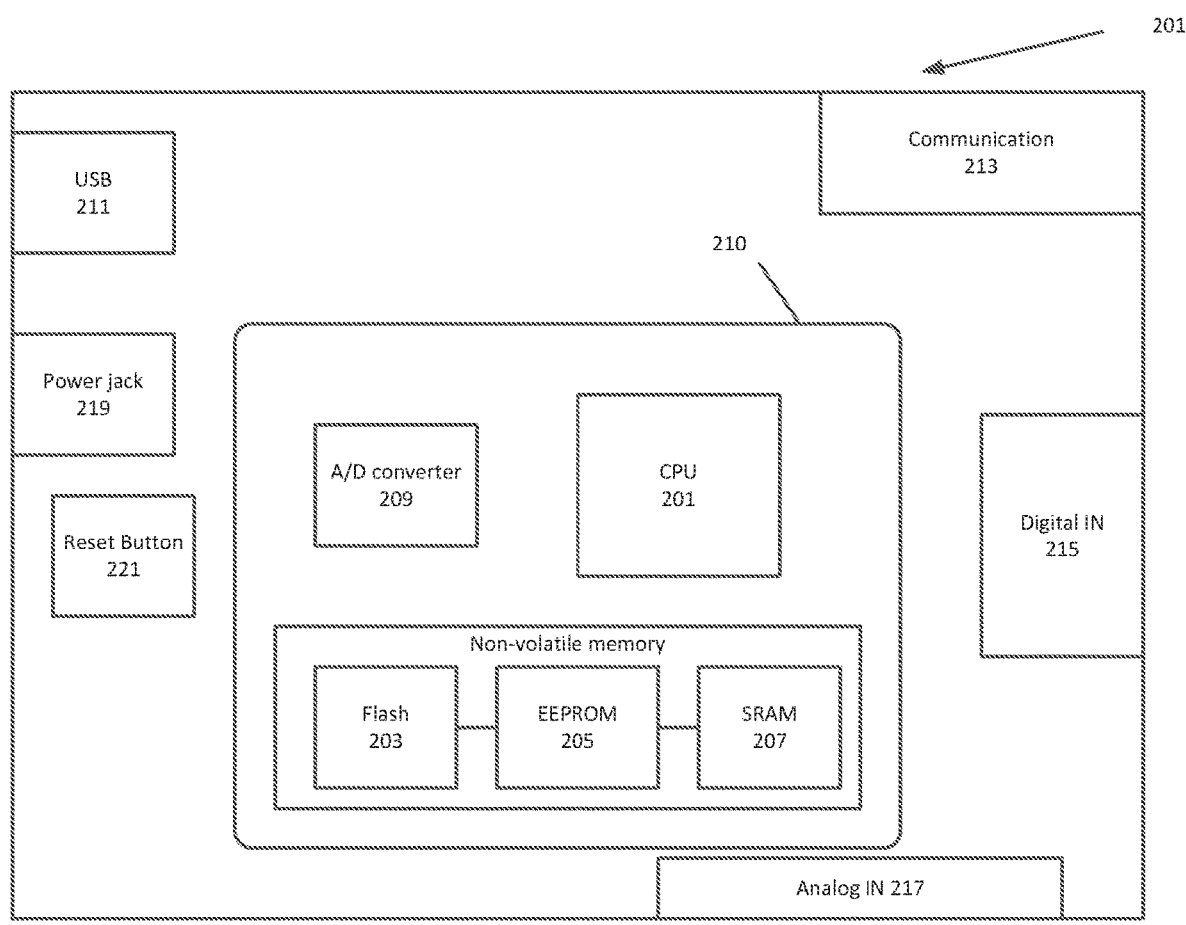
FIG. 14 is a block diagram for a controller for subsystems of the launch and recovery system of FIG. 3 in accordance with an exemplary aspect of the disclosure.

FIG. 14 is a block diagram for a controller for subsystems of the launch and recovery system of FIG. 3 in accordance with an exemplary aspect of the disclosure. The various subsystems may be provided with a microcontroller. A microcontroller may contain one or more processor cores (CPUs) along with memory (volatile and non-volatile) and programmable input/output peripherals. Program memory in the form of flash, ROM, EPROM, or EEPROM is often included on chip, as well as a secondary RAM for data storage. In one embodiment, each subsystem is an integrated circuit board 101 having a microcontroller 210. The board includes digital I/O pins 215, analog inputs 217, hardware serial ports 213, a USB connection 211, a power jack 219, and a reset button 221. It should be understood that other microcontroller-based circuit board configurations are possible. Variations can include the number of pins, whether or not the board includes communication ports or a reset button.

In one embodiment the microcontroller may be a RISC-based microcontroller having 256 KB flash memory 203, 8K SRAM 207, 4 KB EEPROM 205, general purpose I/O lines, 32 general purpose registers, a real time counter, six flexible timer/counters, a 16-channel 10-bit AD converter 209, and a JTAG interface for on-chip debugging. Although this description is of a particular microcontroller, it should be understood that other microcontrollers may be used. Microcontrollers vary based on the number of processing cores, size of non-volatile memory, the size of data memory, as well as whether or not it includes an A/D converter or D/A converter.

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

All publications, patent applications, patents, and other references mentioned herein are incorporated by reference in their entirety. The materials, methods, and examples are illustrative only and are not intended to be limiting, unless otherwise specified.

The above disclosure also encompasses the embodiments listed below.

(1) An automated launch and recovery platform (LRP) for at least one unmanned aircraft-type aerial vehicle (UAV) which automatically performs cyclic tasks of preparation, launch, and recovery, the UAV having a first leverage, the LRP defining an X axis, Y axis and Z axis, the LRP including a stationary foundation in the X-Z plane such that the Y axis is perpendicular to the stationary foundation, a rotatable foundation that can rotate around the Y axis of the stationary foundation, and a rotatable leverage that rotates around the Z axis at a shaft driven by a motor, the first leverage of the UAV is hooked to the rotatable leverage of the LRP such that rotation of the shaft by the motor places the rotatable leverage and the UAV into a service point, or ready-to-start point, and drives the rotatable leverage and the UAV for take-off, the LRP further including: a traffic control subsystem which provides interaction between the automated launch and recovery platform (LRP) and the UAV; and a launch and recovery subsystem which provides initial UAV speed necessary for launch, and ensures the capture of the first leverage by the LRP and dissipation of kinetic energy of a captured. UAV during recovery.

(2) The automated launch and recovery platform of feature (1), in which the unmovable foundation is supplemented with a gyrostabilization system to compensate for rolling of a ship.

(3) The automated launch and recovery platform of features (1) or (2), further including a weather station for detecting wind direction, where the rotatable foundation is configured to be rotated to ensure the UAV has a take-off against the wind.

(4) The automated launch and recovery platform of any of features (1) to (3) in which, during the recovery, the wind speed is estimated as the difference between the air speed of the UAV and the ground speed of the LRP and the UAV approaches the LRP on the leeward side, at a first predetermined distance between the UAV and the LRP, the LRP directs an emitter towards the UAV and the UAV automatically adjusts its trajectory, and at a second predetermined distance between the UAV and the LRP the UAV engine switches off to prevent a collision by the propeller and to remove a drawing engine force of the UAV.

(5) The automated launch and recovery platform of any of features (1) to (4), further including a diagnostics subsystem, in which, after recovery of the UAV and prior to subsequent lift-off of the UAV, the diagnostics subsystem performs automatic diagnostics of the UAV and LRP status to determine if repairs or adjustments are needed.

(6) The automated launch and recovery platform of any of features (1) to (5), in which the shaft is supported by a pair of supporting racks of the rotatable foundation, and in which a distance between the supporting racks of the rotatable foundation exceeds the wing span of the UAV by double the vibration amplitude of the rotatable leverage.

(7) The automated launch and recovery platform of any of features of (1) to (6), in which an end of the rotatable leverage away from the shaft includes a C-shaped locking hook for hooking to the first leverage of the UAV.

(8) The automated launch and recovery platform of any of features (1) to (7), in which the C-shaped locking hook includes a movable post that is movable into an opened position and a closed position.

(9) The automated launch and recovery platform of any of features (1) to (8), in which the C-shaped locking hook is placed in an opened position by a spring actuator.

(10) The automated launch and recovery platform of any of features (1) to (9), in which, during the recovery the rotatable leverage and the first leverage are arranged to allow displacement of the axis of one leverage from the axis of the other leverage at the moment of contact by not more than half of the horizontal width dimension of the first leverage.

(11) A network of automated launch and recovery platforms (LRPs) for at least one aircraft-type aerial vehicle (UAV) which automatically perform cyclic tasks of preparation, launch, and recovery, the UAV having a first leverage, each LRP including: a stationary foundation in an X-Z plane such that a Y axis is perpendicular to the stationary foundation, a rotatable foundation that can rotate around the Y axis of the stationary foundation, and a rotatable leverage that rotates around the Z axis at a shaft driven by a motor, the first leverage of the UAV is hooked to the rotatable leverage of the LRP such that rotation of the shaft by the motor places the rotatable leverage and the UAV into a service point, or ready-to-start point, and drives the rotatable leverage and the UAV for take-off, the network including: a traffic control subsystem which integrates the LRPs and provides interaction between the LRPs and between one of the LRPs and the UAV; and a launch and recovery subsystem which provides initial UAV speed necessary for launch, and ensures the capture of the first leverage by the LRP and dissipation of kinetic energy of a captured UAV during recovery.

(12) The network of feature (11), in which the traffic control subsystem provides centralized control for the network of LRPs and coordinates the transfer of a UAV from one LRP to another LRP.

(13) The network of feature (11) or feature (12), in which, during recovery, the UAV controlled by an autopilot requests permission from a nearest LRP, and if the nearest LRP is occupied, the LRP assesses whether the UAV can fly to another nearby LRP via the traffic control subsystem.

(14) The network of any one of features (11) to (13), in which at least one of the LRPs is located on a ship, and in which the unmovable foundation is supplemented with a gyrostabilization system to compensate for rolling of the ship.

(15) The network of any one of features (11) to (14), further including a weather station for detecting wind direction, where the rotatable foundation of each LRP is configured to be rotated to ensure the UAV has a take-off against the wind.

(16) The network of any one of features (11) to (15), in which, during the recovery the UAV approaches a nearest LRP on the leeward side and the wind speed is estimated as the difference between the air speed of the UAV and the ground speed of the LRP, at a first predetermined distance between the UAV and the LRP, the LRP directs an emitter towards the UAV and the UAV automatically adjusts its trajectory, and at a second predetermined distance between the UAV and the LRP the UAV engine switches off to prevent a collision by the propeller of the UAV and to remove a drawing engine force of the UAV.

(17) The network of any one of features (11) to (16), in which each LRP includes a diagnostics subsystem, in which, after recovery of the UAV and prior to subsequent lift-off of the UAV, the diagnostics subsystem performs automatic diagnostics of the UAV and LRP status to determine if repairs or adjustments are needed.

(18) The network of any one of features (11) to (17), in which at least one of the LRPs that is not occupied by a UAV positions the rotatable leverage in a raised vertical position, and in which, during recovery a locking hook at an end of the rotatable leverage catches an opening of the first leverage and is engaged to hold the UAV to the rotatable leverage.

(19) The network of any one of features (11) to (18), in which at least one of the LRPs that is not occupied by a UAV positions the rotatable leverage in a raised position at an angle offset from vertical, and in which, during recovery the rotatable leverage is rotated when the end of the rotatable leverage catches an opening of the first leverage in order to reduce difference in speeds between the UAV and the rotatable leverage.

(20) A non-transitory computer-readable storage medium storing computer-executable code, which when executed by a computer, coordinates interactive communication between a plurality of automated launch and recovery platforms (LRPs) and between at least one LRP and at least one unmanned aircraft aerial vehicle (UAV); and automatically performs a cycle including: preparing the at least one UAV for launch, launching the at least one UAV, and recovering a UAV, in which the cycle is performed such that initial UAV speed necessary for launch and direction against the wind are provided during the launch, and in which the cycle is performed such that an onboard leverage of the UAV is captured and locked by a rotatable leverage of the LRP and kinetic energy of the UAV is dissipated curing recovery.

(21) A control method for an automated launch and recovery platform (LRP) that performs cyclic tasks of servicing, launch, and recovery of an unmanned aircraft-type aerial vehicle (UAV) having a leverage, the LRP defining an X axis, Y axis and Z axis, the method including: controlling recovery of an approaching UAV by acquiring wind speed and direction at the LRP; communicating the wind speed and direction at the LRP to the approaching UAV; rotating a rotatable foundation of the LRP around the Y axis such that the LRP is positioned to recover the UAV approaching against the wind with respect to the LRP; transmitting a signal toward the UAV for trajectory adjustment of the UAV; setting a rotatable leverage of the LRP into a recovery position, the rotatable leverage being configured to rotate around the Z axis at a shaft driven by a motor; and engaging the rotatable leverage with the leverage of the UAV such that rotation of the shaft by the motor places the rotatable leverage and the UAV into a service point; controlling automatic servicing of a UAV held at the service point by the rotatable leverage, the servicing including at least one of refueling, recharging, unloading a payload, loading a new payload, de-icing, performing routine maintenance, downloading data, and uploading software updates; and controlling take-off of a UAV from the service point in which the UAV is held by the rotatable leverage by acquiring wind speed and direction at the LRP; rotating the rotatable foundation of the LRP around the Y axis such that the LRP is positioned to for a take-off against the wind of the UAV with respect to the LRP; rotating the rotatable leverage with positive acceleration such that the UAV is moving at a necessary take-off speed at an upper point in the movement trajectory of the rotatable leverage; and disengaging the rotatable leverage from the leverage of the UAV at the upper point.

What is claimed is:

1. An automated launch and landing platform (LLP) for an unmanned aircraft-type aerial vehicle (UAV) that is located within a plane along X axis, Y axis and Z axis, the LLP comprises:
an unmovable foundation (UmF) that is immovably mounted on a surface in the plane along the X axis and the Z axis such that the Y axis is perpendicular to the UmF;
a rotatable foundation (RF) that is mounted on the UmF, the RF is configured to rotate around the Y axis of the UmF to enable UAV launch or landing against wind, the rotatable foundation being driven by a drive;
two angled support racks fixed to the RF, which are connected by a rotatable shaft in an upper portion, wherein the rotatable shaft rotates around its own axis and is driven by a drive mounted at the rotatable shaft;
a rotatable leverage that is fixed, at one end, to the rotatable shaft connected to the RF, thereby rotating the rotatable leverage, and is fixed, at another end, to a docking device that is configured to engage to a UAV leverage that is driven by the UAV drive,
wherein the LLP has length and width in the X axis and Z axis directions that do not exceed 1.5 times a wing span of the UAV, and the wing span of the UAV is smaller than a distance between the angled support racks of the RF,
wherein a height of the RF is greater than a total length of the rotatable leverage fixed by means of the docking device of the UAV, taking into account a maximum possible deviation of the UAV during launch and landing, so as to enable the UAV to pass in the lowermost point of the LLP;
wherein an angle of the rotatable leverage is 5°-28° along the Y axis during the launch;

wherein during the UAV landing, the rotatable leverage and the UAV leverage are mounted such that a displacement of the axis of the rotatable leverage relative to the UAV leverage at a moment of contact is not more than a half of the width of the UAV;

the LLP further comprises:

a traffic control subsystem that is configured to provide an interaction between the LLP and the UAV during the launch and the landing, wherein the traffic control subsystem comprises a controller, a radio exchange channel between the LLP and the UAV, an emitter having a selected range or a reflector configured to adjust a flying trajectory of the UAV; and a launch and landing subsystem that is configured to provide an initial UAV speed necessary for launch, and to ensure a capture during the landing by means of the rotatable leverage of the LLP, and to ensure a dissipation of a kinetic energy of the UAV that is captured by the rotatable leverage during the landing, wherein the launch and landing subsystem includes a microcontroller.

2. The automated launch and landing platform according to claim 1, further comprising a gyrostabilization system mounted on the UmF.

3. The automated launch and landing platform according to claim 1, comprising a weather station that is configured to determine a wind direction and speed, when the UAV is at a distance of about 300-500 m from the LLP.

4. The automated launch and landing platform according to claim 2, comprising a weather station that is configured to determine a wind direction and speed, when the UAV is at a distance of about 300-500 m from the LLP.

5. The automated launch and landing platform according to claim 1, wherein the docking device that is fixed to the rotatable leverage is a C-shaped locking hook that is capable of engaging the UAV during the landing or disengaging the UAV during the launch.

6. The automated launch and landing platform according to claim 5, wherein the C-shaped locking hook is made as a movable post that is configured to be arranged in an opened position and a closed position.

7. The automated launch and landing platform according to claim 5, wherein the C-shaped locking hook includes a spring actuator.

8. The automated launch and landing platform according to claim 6, wherein the C-shaped locking hook includes a spring actuator.

9. The automated launch and landing platform according to claim 1, wherein the rotatable leverage is made flexible.

* * * * *

UNITED STATES PATENT AND TRADEMARK OFFICE
CERTIFICATE OF CORRECTION

PATENT NO. : 11,370,538 B2
APPLICATION NO. : 16/217663
DATED : June 28, 2022
INVENTOR(S) : Stepura et al.

It is certified that error appears in the above-identified patent and that said Letters Patent is hereby corrected as shown below:

In the Specification

In Column 6, Line 64, delete "RI:" and insert -- RL --, therefor.

In Column 9, Line 17, delete "leak" and insert -- least --, therefor.

In Column 9, Line 58, delete "triode." and insert -- mode. --, therefor.

In Column 10, Line 53, insert -- to -- after "post".

In Column 13, Line 32, delete "RI," and insert -- RL --, therefor.

In Column 14, Line 32, delete "a of" and insert -- of a --, therefor.

In Column 15, Line 10, delete "AD" and insert -- A/D --, therefor.

Signed and Sealed this
Seventh Day of February, 2023

*Katherine Kelly Vidal*

Katherine Kelly Vidal
*Director of the United States Patent and Trademark Office*